United States Patent
Teamey et al.

(10) Patent No.: US 8,500,987 B2
(45) Date of Patent: Aug. 6, 2013

(54) PURIFICATION OF CARBON DIOXIDE FROM A MIXTURE OF GASES

(75) Inventors: Kyle Teamey, Washington, DC (US); Emily Barton Cole, Princeton, NJ (US); Narayanappa Sivasankar, Plainsboro, NJ (US); Andrew Bocarsly, Plainsboro, NJ (US)

(73) Assignee: Liquid Light, Inc., Monmouth Junction, NJ (US)

( * ) Notice: Subject to any disclaimer, the term of this patent is extended or adjusted under 35 U.S.C. 154(b) by 287 days.

(21) Appl. No.: 12/845,995

(22) Filed: Jul. 29, 2010

(65) Prior Publication Data

US 2011/0114501 A1 May 19, 2011

Related U.S. Application Data

(60) Provisional application No. 61/315,665, filed on Mar. 19, 2010.

(51) Int. Cl.
C25B 1/00 (2006.01)
B01D 17/06 (2006.01)

(52) U.S. Cl.
USPC .......................................... 205/555; 205/763

(58) Field of Classification Search
USPC .................................. 205/555, 763
See application file for complete search history.

(56) References Cited

U.S. PATENT DOCUMENTS

| | | | |
|---|---|---|---|
| 3,399,966 A | 9/1968 | Suzuki et al. | |
| 3,401,100 A * | 9/1968 | Macklin | 205/345 |
| 3,560,354 A | 2/1971 | Young | |
| 3,636,159 A | 1/1972 | Solomon | |
| 3,720,591 A | 3/1973 | Skarlos | |
| 3,779,875 A | 12/1973 | Michelet | |
| 3,899,401 A | 8/1975 | Nohe et al. | |
| 3,959,094 A | 5/1976 | Steinberg | |
| 4,072,583 A * | 2/1978 | Hallcher et al. | 205/423 |
| 4,088,682 A | 5/1978 | Jordan | |
| 4,160,816 A | 7/1979 | Williams et al. | |
| 4,219,392 A | 8/1980 | Halmann | |

(Continued)

FOREIGN PATENT DOCUMENTS

| AU | 2012202601 A1 | 5/2012 |
|---|---|---|
| CA | 2604569 A1 | 10/2006 |

(Continued)

OTHER PUBLICATIONS

Jitaru, Electrochemical Carbon Dioxide Reduction—Fundamental and Applied Topics (Review), Journal of the University of Chemical Technology and Metallurgy (no month, 2007), vol. 42, No. 4, pp. 333-344.*

(Continued)

Primary Examiner — Edna Wong
(74) Attorney, Agent, or Firm — Suiter Swantz pc llo

(57) ABSTRACT

A method for purification of carbon dioxide from a mixture of gases is disclosed. The method generally includes steps (A) and (B). Step (A) may bubble the gases into a solution of an electrolyte and a catalyst in an electrochemical cell. The electrochemical cell may include an anode in a first cell compartment and a cathode in a second cell compartment. The cathode generally reduces the carbon dioxide into one or more compounds. The anode may oxidize at least one of the compounds into the carbon dioxide. Step (B) may separate the carbon dioxide from the solution.

4 Claims, 7 Drawing Sheets

U.S. PATENT DOCUMENTS

| | | |
|---|---|---|
| 4,381,978 A | 5/1983 | Gratzel et al. |
| 4,414,080 A | 11/1983 | Williams et al. |
| 4,439,302 A | 3/1984 | Wrighton et al. |
| 4,450,055 A | 5/1984 | Stafford |
| 4,451,342 A | 5/1984 | Lichtin et al. |
| 4,460,443 A | 7/1984 | Somorjai et al. |
| 4,474,652 A | 10/1984 | Brown et al. |
| 4,476,003 A | 10/1984 | Frank et al. |
| 4,478,694 A | 10/1984 | Weinberg |
| 4,478,699 A | 10/1984 | Halmann et al. |
| 4,595,465 A | 6/1986 | Ang et al. |
| 4,608,132 A | 8/1986 | Sammells |
| 4,608,133 A | 8/1986 | Morduchowitz et al. |
| 4,609,440 A | 9/1986 | Frese, Jr. et al. |
| 4,609,441 A | 9/1986 | Frese, Jr. et al. |
| 4,609,451 A | 9/1986 | Sammells et al. |
| 4,619,743 A | 10/1986 | Cook |
| 4,620,906 A | 11/1986 | Ang |
| 4,668,349 A | 5/1987 | Cuellar et al. |
| 4,673,473 A | 6/1987 | Ang et al. |
| 4,702,973 A | 10/1987 | Marianowski |
| 4,756,807 A | 7/1988 | Meyer et al. |
| 4,776,171 A | 10/1988 | Perry, Jr. et al. |
| 4,793,904 A | 12/1988 | Mazanec et al. |
| 4,824,532 A | 4/1989 | Moingeon et al. |
| 4,855,496 A | 8/1989 | Anderson et al. |
| 4,897,167 A | 1/1990 | Cook et al. |
| 4,902,828 A | 2/1990 | Wickenhaeuser et al. |
| 4,921,586 A | 5/1990 | Molter |
| 4,936,966 A | 6/1990 | Garnier et al. |
| 4,945,397 A | 7/1990 | Schuetz |
| 4,959,131 A | 9/1990 | Cook et al. |
| 5,064,733 A | 11/1991 | Krist et al. |
| 5,246,551 A | 9/1993 | Pletcher et al. |
| 5,284,563 A | 2/1994 | Fujihira et al. |
| 5,382,332 A | 1/1995 | Fujihira et al. |
| 5,443,804 A | 8/1995 | Parker et al. |
| 5,587,083 A | 12/1996 | Twardowski |
| 5,763,662 A | 6/1998 | Ikariya et al. |
| 5,804,045 A | 9/1998 | Orillon et al. |
| 5,858,240 A | 1/1999 | Twardowski et al. |
| 5,928,806 A | 7/1999 | Olah et al. |
| 6,024,935 A | 2/2000 | Mills et al. |
| 6,187,465 B1 | 2/2001 | Galloway |
| 6,251,256 B1 | 6/2001 | Blay et al. |
| 6,270,649 B1 | 8/2001 | Zeikus et al. |
| 6,409,893 B1 | 6/2002 | Holzbock et al. |
| 6,657,119 B2 | 12/2003 | Lindquist et al. |
| 6,755,947 B2 | 6/2004 | Schulze et al. |
| 6,777,571 B2 | 8/2004 | Chaturvedi et al. |
| 6,806,296 B2 | 10/2004 | Shiroto et al. |
| 6,887,728 B2 | 5/2005 | Miller et al. |
| 6,906,222 B2 | 6/2005 | Slany et al. |
| 6,936,143 B1 | 8/2005 | Graetzel et al. |
| 6,942,767 B1 | 9/2005 | Fazzina et al. |
| 7,037,414 B2 | 5/2006 | Fan |
| 7,052,587 B2 | 5/2006 | Gibson et al. |
| 7,094,329 B2 | 8/2006 | Saha et al. |
| 7,314,544 B2 | 1/2008 | Murphy et al. |
| 7,318,885 B2 | 1/2008 | Omasa |
| 7,338,590 B1 | 3/2008 | Shelnutt et al. |
| 7,361,256 B2 | 4/2008 | Henry et al. |
| 7,378,561 B2 | 5/2008 | Olah et al. |
| 7,704,369 B2 | 4/2010 | Olah et al. |
| 7,883,610 B2 | 2/2011 | Monzyk et al. |
| 8,313,634 B2 | 11/2012 | Bocarsly et al. |
| 2001/0026884 A1 | 10/2001 | Appleby et al. |
| 2003/0029733 A1 | 2/2003 | Otsuka et al. |
| 2004/0089540 A1 | 5/2004 | Van Heuveln et al. |
| 2005/0011755 A1 | 1/2005 | Jovic et al. |
| 2005/0011765 A1 | 1/2005 | Omasa |
| 2005/0051439 A1 | 3/2005 | Jang |
| 2006/0102468 A1 | 5/2006 | Monzyk et al. |
| 2006/0235091 A1 | 10/2006 | Olah et al. |
| 2006/0243587 A1 | 11/2006 | Tulloch et al. |
| 2007/0045125 A1 | 3/2007 | Hartvigsen et al. |
| 2007/0054170 A1 | 3/2007 | Isenberg |
| 2007/0122705 A1 | 5/2007 | Paulsen et al. |
| 2007/0184309 A1 | 8/2007 | Gust, Jr. et al. |
| 2007/0224479 A1 | 9/2007 | Tadokoro et al. |
| 2007/0231619 A1 | 10/2007 | Strobel et al. |
| 2007/0240978 A1 | 10/2007 | Beckmann et al. |
| 2007/0254969 A1 | 11/2007 | Olah et al. |
| 2007/0282021 A1 | 12/2007 | Campbell |
| 2008/0011604 A1 | 1/2008 | Stevens et al. |
| 2008/0039538 A1 | 2/2008 | Olah et al. |
| 2008/0060947 A1 | 3/2008 | Kitsuka et al. |
| 2008/0072496 A1 | 3/2008 | Yogev et al. |
| 2008/0090132 A1 | 4/2008 | Ivanov et al. |
| 2008/0116080 A1 | 5/2008 | Lal et al. |
| 2008/0145721 A1 | 6/2008 | Shapiro et al. |
| 2008/0223727 A1 | 9/2008 | Oloman et al. |
| 2008/0283411 A1 | 11/2008 | Eastman et al. |
| 2008/0287555 A1 | 11/2008 | Hussain et al. |
| 2008/0296146 A1 | 12/2008 | Toulhoat et al. |
| 2009/0014336 A1 | 1/2009 | Olah et al. |
| 2009/0030240 A1 | 1/2009 | Olah et al. |
| 2009/0038955 A1 | 2/2009 | Rau |
| 2009/0061267 A1 | 3/2009 | Monzyk et al. |
| 2009/0069452 A1 | 3/2009 | Robota |
| 2009/0134007 A1 | 5/2009 | Solis Herrera |
| 2009/0277799 A1 | 11/2009 | Grimes |
| 2010/0084280 A1 | 4/2010 | Gilliam et al. |
| 2010/0147699 A1 | 6/2010 | Wachsman et al. |
| 2010/0150802 A1 | 6/2010 | Gilliam et al. |
| 2010/0180889 A1 | 7/2010 | Monzyk et al. |
| 2010/0187123 A1 | 7/2010 | Bocarsly et al. |
| 2010/0191010 A1 | 7/2010 | Bosman et al. |
| 2010/0193370 A1 | 8/2010 | Olah et al. |
| 2010/0196800 A1 | 8/2010 | Markoski et al. |
| 2010/0213046 A1 | 8/2010 | Grimes et al. |
| 2010/0248042 A1 | 9/2010 | Nakagawa et al. |
| 2010/0307912 A1 | 12/2010 | Zommer |
| 2011/0014100 A1 | 1/2011 | Bara et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0143929 A1 | 6/2011 | Sato et al. |
| 2011/0186441 A1 | 8/2011 | LaFrancois et al. |
| 2011/0226632 A1 | 9/2011 | Cole et al. |

FOREIGN PATENT DOCUMENTS

| | | |
|---|---|---|
| DE | 1047765 A | 12/1958 |
| DE | 2301032 A * | 7/1974 |
| EP | 0111870 B1 | 12/1983 |
| EP | 0081982 B1 | 5/1985 |
| EP | 0277048 B1 | 3/1988 |
| EP | 0390157 B1 | 5/2000 |
| FR | 2780055 A1 | 12/1999 |
| JP | 62120489 A | 6/1987 |
| JP | 07258877 A | 10/1995 |
| JP | 2004344720 A | 12/2004 |
| JP | 2006188370 A | 7/2006 |
| JP | 2007185096 A | 7/2007 |
| KR | 20040009875 A | 1/2004 |
| WO | WO9850974 A1 | 11/1998 |
| WO | WO 0015586 A1 | 3/2000 |
| WO | WO0025380 A2 | 5/2000 |
| WO | WO02059987 A3 | 8/2002 |
| WO | WO 03004727 A2 | 1/2003 |
| WO | WO 2004067673 A1 | 8/2004 |
| WO | WO2007041872 A1 | 4/2007 |
| WO | WO2007058608 A1 | 5/2007 |
| WO | WO2007119260 A2 | 10/2007 |
| WO | WO2008016728 A2 | 2/2008 |
| WO | WO2008017838 A1 | 2/2008 |
| WO | WO2008124538 A1 | 10/2008 |
| WO | WO09002566 A1 | 12/2008 |
| WO | WO2009145624 A1 | 12/2009 |
| WO | WO2010010252 A2 | 1/2010 |
| WO | WO2010042197 A1 | 4/2010 |
| WO | WO2010088524 A2 | 8/2010 |
| WO | WO2010138792 A1 | 12/2010 |
| WO | WO2011010109 A1 | 1/2011 |
| WO | WO2011068743 A2 | 6/2011 |

| WO | WO2011120021 A1 | 9/2011 |
| WO | WO2011123907 A1 | 10/2011 |
| WO | WO2011133264 A1 | 10/2011 |

OTHER PUBLICATIONS

Sloop et al., "The Role of Li-Ion Battery Electrolyte Reactivity in Performance Decline and Self-Discharge", Journal of Power Sources (no month, 2003), vols. 119-121, pp. 330-337.*

Udupa et al., "The Electrolytic Reduction of Carbon Dioxide to Formic Acid", Electrochimica Acta (no month, 1971), vol. 16, pp. 1593-1598.*

Cook, MacDuff, and Sammells; High Rate Gas Phase CO2 Reduction to Ethylene and Methane Using Gas Diffusion Electrodes, J. Electrochem. Soc., vol. 137, No. 2, pp. 607-608, Feb. 1990, © The Electrochemical Society, Inc.

Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.

Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.

J. Augustynski, P. Kedzierzawski, and B. Jermann, Electrochemical Reduction of CO2 at Metallic Electrodes, Studies in Surface Science and Catalysis, vol. 114, pp. 107-116, © 1998 Elsevier Science B.V.

Sung-Woo Lee, Jea-Keun Lee, Kyoung-Hag Lee, and Jun-Heok Lim, Electrochemical reduction of CO and H2 from carbon dioxide in aqua-solution, Current Applied Physics, vol. 10, 2010, pp. S51-S54.

Andrew P. Abbott and Christopher A. Eardley, Electrochemical Reduction of CO2 in a Mixed Supercritical Fluid, J. Phys. Chem. B, 2000, vol. 104, pp. 775-779.

Matthew R. Hudson, Electrochemical Reduction of Carbon Dioxide, Dec. 9, 2005, pp. 1-15.

S. Kapusta and N. Hackerman, The Electrochemical of Carbon Dioxide and Formic Acid on Tin and Indium Electrodes, J. Electrochem. Soc.: Electrochemical Science and Technology, Mar. 1983, pp. 607-613.

M Aulice Scibioh and B Viswanathan, Electrochemical Reduction of Carbon Dioxide: A Status Report, Proc Indian Natn Sci Acad, vol. 70, A, No. 3, May 2004, pp. 1-56.

N. L. Weinberg, D. J. Mazur, Electrochemical hydrodimerization of formaldehyde to ethylene glycol, Journal of Applied Electrochemistry, vol. 21, 1991, pp. 895-901.

R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in the Netherlands.

M.N. Mahmood, D. Masheder, and C.J. Harty, Use of gas-diffusion electrodes for high-rate electrochemical reduction of carbon dioxide. I. Reduction at lead, indium- and tin-impregnated electrodes, Journal of Applied Electrochemistry, vol. 17, 1987, pp. 1159-1170.

Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in The Netherlands.

Frese and Leach, Electrochemical Reduction of Carbon Dioxide to Methane, Methanol, and CO on Ru Electrodes, Journal of the Electrochemical Society, Jan. 1985, pp. 259-260.

Frese and Canfield, Reduction of CO2 on n-GaAs Electrodes and Selective Methanol Synthesis, J. Electrochem. Soc.: Electrochemical Science and Technology, vol. 131, No. 11, Nov. 1984, pp. 2518-2522.

Shibata, Yoshida, and Furuya, Electrochemical Synthesis of Urea at Gas-Diffusion Electrodes, J. Electrochem. Soc., vol. 145, No. 2, Feb. 1998, © The Electrochemical Society, Inc., pp. 595-600.

Shibata and Furuya, Simultaneous reduction of carbon dioxide and nitrate ions at gas-diffusion electrodes with various metallophthalocyanine catalysts, Electrochimica Acta 48, 2003, pp. 3953-3958.

M. Gattrell, N. Gupta, and A. CO, A Review of the aqueous electrochemical reduction of CO2 to hydrocarbons at copper, Journal of Electroanalytical Chemistry, vol. 594, 2006, pp. 1-19.

Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.

Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.

J. Giner, Electrochemical Reduction of CO2 on Platinum Electrodes in Acid Solutions, Electrochimica Acta, 1963, vol. 8, pp. 857-865, Pregamon Press Ltd., Printed in Northern Ireland.

John Leonard Haan, Electrochemistry of Formic Acid and Carbon Dioxide on Metal Electrodes with Applications to Fuel Cells and Carbon Dioxide Conversion Devices, 2010, pp. 1-205.

M. Halmann, Photoelectrochemical reduction of aqueous carbon dioxide on p-type gallium phosphide in liquid junction solar cells, Nature, vol. 275, Sep. 14, 1978, pp. 115-116.

H. Ezaki, M. Morinaga, and S. Watanabe, Hydrogen Overpotential for Transition Metals and Alloys, and its Interpretation Using an Electronic Model, Electrochimica Acta, vol. 38, No. 4, 1993, pp. 557-564, Pergamon Press Ltd., Printed in Great Britain.

K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.

Ougitani, Aizawa, Sonoyama, and Sakata; Temperature Dependence of the Probability of Chain Growth for Hydrocarbon Formation by Electrochemical Reduction of CO2, Bull. Chem. Soc. Jpn., vol. 74, pp. 2119-2122, 2001.

Furuya, Yamazaki, and Shibata; High performance Ru-Pd catalysts for CO2 reduction at gas-diffusion electrodes, Journal of Electroanalytical Chemistry, vol. 431, 1997, pp. 39-41.

R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.

Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.

Y. Hori, Electrochemical CO2 Reduction on Metal Electrodes, Modern Aspects of Electrochemistry, No. 42, edited by C. Vayenas et al., Springer, New York, 2008, pp. 89-189.

Hori, Yoshio; Suzuki, Shin, Cathodic Reduction of Carbon Dioxide for Energy Storage, Journal of the Research Institute for Catalysis Hokkaido University, 30(2): 81-88, Feb. 1983, http://hdl.handle.net/2115/25131.

Hori, Wakebe, Tsukamoto, and Koga; Electrocatalytic Process of CO Selectivity in Electrochemical Reduction of CO2 at Metal Electrodes in Aqueous Media, Electrochimica Acta, vol. 39, No. 11/12, pp. 1833-1839, 1994, Copyright 1994 Elsevier Science Ltd.,Pergamon, Printed in Great Britain.

Hori, Kikuchi, and Suzuki; Production of CO and CH4 in Electrochemical Reduction of CO2 at Metal Electrodes in Aqueous Hydrogencarbonate Solution; Chemistry Letters, 1985, pp. 1695-1698, Copyright 1985 The Chemical Society of Japan.

Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.

Hoshi, Suzuki, and Hori; Step Density Dependence of CO2 Reduction Rate on Pt(S)-[n(111)×(111)] Single Crystal Electrodes, Electrochimica Acta, vol. 41, No. 10, pp. 1617-1653, 1996, Copyright 1996 Elsevier Science Ltd. Printed in Great Britain.

Hoshi, Suzuki, and Hori; Catalytic Activity of CO2 Reduction on Pt Single-Crystal Electrodes: Pt(S)-[n(111)×(111)], Pt(S)-[n(111)×(100)], and Pt(S)-[n(100)×(111)], J. Phys. Chem. B, 1997, vol. 101, pp. 8520-8524.

Ikeda, Saito, Yoshida, Noda, Maeda, and Ito; Photoelectrochemical reduction products of carbon dioxide at metal coated p-GaP photocathodes in non-aqueous electrolytes, J. Electroanal. Chem., 260 (1989) pp. 335-345, Elsevier Sequoia S.A., Lausanne—Printed in The Netherlands.

Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2459-2462, 1990, Copyright 1990 The Chemical Society of Japan.

S.R. Narayanan, B. Haines, J. Soler, and T.I. Valdez; Electrochemical Conversion of Carbon Dioxide to Formate in Alkaline Polymer Electrolyte Membrane Cells, Journal of The Electrochemical Society, 158 (2) A167-A173 (2011).

Tooru Inoue, Photoelectrocatalytic reduction of carbon dioxide in aqueous suspensions of semiconductor powders, Nature, vol. 277, Feb. 22, 1979, pp. 637-638.

B. Jermann and J. Augustynski, Long-Term Activation of the Copper Cathode in the Course of CO2 Reduction, Electrochimica Acta, vol. 39, No. 11112, pp. 1891-1896, 1994, Elsevier Science Ltd., Printed in Great Britain.

Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.

Maria Jitaru, Electrochemical Carbon Dioxide Reduction-Fundamental and Applied Topics (Review), Journal of the University of Chemical Technology and Metallurgy, 42, 4, 2007, 333-344.

Kaneco, Katsumata, Suzuki, and Ohta; Photoelectrocatalytic reduction of CO2 in LiOH/methanol at metal-modified p-InP electrodes, Applied Catalysis B: Environmental 64 (2006) 139-145.

J.J. Kim, D.P. Summers, and K.W. Frese, Jr; Reduction of CO2 and CO to Methane on Cu Foil Electrodes, J. Electroanal. Chem., 245 (1988) 223-244, Elsevier Sequoia S.A., Lausanne—Printed in The Netherlands.

Osamu Koga and Yoshio Hori, Reduction of Adsorbed CO on a Ni Electrode in Connection With the Electrochemical Reduction of CO2, Electrochimica Acta, vol. 38, No. 10, pp. 1391-1394,1993, Printed in Great Britain.

Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.

Simon-Manso and Kubiak, Dinuclear Nickel Complexes as Catalysts for Electrochemical Reduction of Carbon Dioxide, Organometallics 2005, 24, pp. 96-102, © 2005 American Chemical Society.

Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.

Kuwabata, Nishida, Tsuda, Inoue, and Yoneyama; Photochemical Reduction of Carbon Dioxide to Methanol Using ZnS Microcrystallite as a Photocatalyst in the Presence of Methanol Dehydrogenase, J. Electrochem. Soc., vol. 141, No. 6, pp. 1498-1503, Jun. 1994, © The Electrochemical Society, Inc.

Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory/85/8518cover.html.

Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.

Columbia, Crabtree, and Thiel; The Temperature and Coverage Dependences of Adsorbed Formic Acid and Its Conversion to Formate on Pt(111), J. Am. Chem. Soc., vol. 114, No. 4, 1992, pp. 1231-1237.

Brian R. Eggins and Joanne McNeill, Voltammetry of Carbon Dioxide, Part I. A General Survey of Voltammetry At Different Electrode Materials in Different Solvents, J. Electroanal. Chem., 148 (1983) 17-24, Elsevier Sequoia S.A., Lausanne—Printed in The Netherlands.

Varghese, Paulose, Latempa, and Grimes; High-Rate Solar Photocatalytic Conversion of CO2 and Water Vapor to Hydrocarbon Fuels; Nano Letters, 2009, vol. 9, No. 2, pp. 731-737.

Han, Chu, Kim, Song, and Kim; Photoelectron spectroscopy and ab initio study of mixed cluster anions of [(CO21-3(Pyridine)1-6: Formation of a covalently bonded anion core of (C5H5N—CO2), Journal of Chemical Physics, vol. 113, No. 2, Jul. 8, 2000, pp. 596-601.

Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.

Lin and Frei, Bimetallic redox sites for photochemical CO2 splitting in mesoporous silicate sieve, C. R. Chimie 9 (2006) 207-213.

Heyduk, MacIntosh, and Nocera; Four-Electron Photochemistry of Dirhodium Fluorophosphine Compounds, J. Am. Chem. Soc. 1999, 121, 5023-5032.

Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.

Hwang and Shaka, Water Suppression That Works. Excitation Sculpting Using Arbitrary Waveforms and Pulsed Field Gradients, Journal of Magnetic Resonance, Series A 112, 275-279 (1995).

Weissermel and Arpe, Industrial Organic Chemistry, 3rd Edition 1997, Published jointly by VCH Verlagsgesellschaft mbH, Weinheim (Federal Republic of Germany) VCH Pubiishers, Inc., New York, NY (USA), pp. 1-481.

T. Iwasita, . C. Nart, B. Lopez and W. Vielstich; On the Study of Adsorbed Species at Platinum From Methanol, Formic Acid and Reduced Carbon Dioxide Via In Situ FT-ir Spectroscopy, Electrochimica Atca, vol. 37. No. 12. pp. 2361-2367, 1992, Printed in Great Britain.

Lackner, Grimes, and Ziock; Capturing Carbon Dioxide From Air; pp. 1-15.

Kang, Kim, Lee, Hong, and Moon; Nickel-based tri-reforming catalyst for the production of synthesis gas, Applied Catalysis, A: General 332 (2007) 153-158.

Kostecki and Augustynski, Electrochemical Reduction of CO2 at an Activated Silver Electrode, Ber. Bunsenges. Phys. Chem. 98, 1510-1515 (1994) No. I2 C VCH Verlagsgesellschaft mbH, 0-69451 Weinheim, 1994.

Kunimatsu and Kita; Infrared Spectroscopic Study of Methanol and Formic Acid Adsorrates on a Platinum Electrode, Part II. Role of the Linear CO(a) Derived From Methanol and Formic Acid in the Electrocatalytic Oxidation of CH,OH and HCOOH, J Electroanal Chem., 218 (1987) 155-172, Elsevier Sequoia S A , Lausanne—Printed in The Netherlands.

Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.

Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.

R.J.L. Martin, The Mechanism of the Cannizzaro Reaction of Formaldehyde, May 28, 1954, pp. 335-347.

Fujitani, Nakamura, Uchijima, and Nakamura; The kinetics and mechanism of methanol synthesis by hydrogenation of CO2 over a Zn-deposited Cu(111surface, Surface Science 383 (1997) 285-298.

Richard S. Nicholson and Irving Shain, Theory of Stationary Electrode Polarography, Single Scan and Cyclic Methods Applied to Reversible, Irreversible, and Kinetic Systems, Analytical Chemistry, vol. 36, No. 4, Apr. 1964, pp. 706-723.

Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).

Joseph W. Ochterski, Thermochemistry in Gaussian, (c)2000, Gaussian, Inc., Jun. 2, 2000, 19 Pages.

Kotaro Ogura and Mitsugu Takagi, Electrocatalytic Reduction of Carbon Dioxide to Methanol, Part IV. Assessment of the Current-Potential Curves Leading to Reduction, J. Electroanal. Chem., 206 (1986) 209-216, Elsevier Sequoia S.A., Lausanne—Printed in The Netherlands.

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.

Ohmstead and Nicholson, Cyclic Voltammetry Theory for the Disproportionation Reaction and Spherical Diffusion, Analytical Chemistry, vol. 41, No. 6, May 1969, pp. 862-864.

Shunichi Fukuzumi, Bioinspired Energy Conversion Systems for Hydrogen Production and Storage, Eur. J. Inorg. Chem. 2008, 1339-1345.

Angamuthu, Byers, Lutz, Spek, and Bouwman; Electrocatalytic CO2 Conversion to Oxalate by a Copper Complex, Science, vol. 327, Jan. 15, 2010, pp. 313-315.

J- Fischer, Th. Lehmann, and E. Heitz; The production of oxalic acid from CO2 and H2O, Journal of Applied Electrochemistry 11 (1981) 743-750.

Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.

Rudolph, Dautz, and Jager; Macrocyclic [N42-] Coordinated Nickel Complexes as Catalysts for the Formation of Oxalate by Electrochemical Reduction of Carbon Dioxide, J. Am. Chem. Soc. 2000, 122, 10821-10830.

D.A. Shirley, High-Resolution X-Ray Photoemission Spectrum of the Valence Bands of Gold, Physical Review B, vol. 5, No. 12, Jun. 15, 1972, pp. 4709-4714.

S.G. Sun and J. Clavilier, The Mechanism of Electrocatalytic Oxidation of Formic Acid on Pt (100) and Pt (111) in Sulphuric Acid Solution: An Emirs Study, J. Electroanal. Chem., 240 (1988) 147-159, Elsevier Sequoia S.A., Lausanne—Printed in The Netherlands.

Sun, Lin, Li, and Mu; Kinetics of dissociative adsorption of formic acid on Pt(100), Pt(610), Pt(210), and Pt(110) single-crystal electrodes in perchloric acid solutions, Journal of Electroanalytical Chemistry, 370 (1994) 273-280.

Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.

Zhao, Fan, and Wang, Photo-catalytic CO2 reduction using sol-gel derived titania-supported zinc-phthalocyanine, Journal of Cleaner Production 15 (2007) 1894-1897.

Tanaka and Ooyama, Multi-electron reduction of CO2 via Ru-CO2, -C(O)OH, -Co, -CHO, and -CH2OH species, Coordination Chemistry Reviews 226 (2002) 211-218.

Toyohara, Nagao, Mizukawa, and Tanaka, Ruthenium Formyl Complexes as the Branch Point in Two- and Multi-Electron Reductions of CO2, Inorg. Chem. 1995, 34, 5399-5400.

Watanabe, Shibata, and Kato; Design of Ally Electrocatalysts for CO2 Reduction, III. The Selective and Reversible Reduction of CO2 on Cu Alloy Electrodes; J. Electrochem. Soc., vol. 138, No. 11, Nov. 1991, pp. 3382-3389.

Dr. Chao Lin, Electrode Surface Modification and its Application to Electrocatalysis, V. Catalytic Reduction of Carbon Dioxide to Methanol, Thesis, 1992, Princeton University, pp. 157-179.

Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of CO2 to Methanol at Low Overpotentials, 1994, Princeton University, pp. 52-85.

Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.

Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.

Goettmann, Thomas, and Antonietti; Metal-Free Activation of CO2 by Mesoporous Graphitic Carbon Nitride; Angewandte Chemie; Angew. Chem. Int. Ed. 2007, 46, 2717-2720.

Yu B Vassiliev, V S Bagotzky, O.A. Khazova and NA Mayorova; Electroreduction of Carbon Dioxide Part II. The Mechanism of Reduction in Aprotic Solvents, J Electroanal. Chem, 189 (1985) 295-309 Elsevier Sequoia S.A. , Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/13(9)/B109/3/$28.00 © The Electrochemical Society.

Zhai, Chiachiarelli, and Sridhar; Effects of Gaseous Impurities on the Electrochemical Reduction of CO2 on Copper Electrodes; ECS Transactions, 19 (14) 1-13 (2009), 10.1149/1.3220175 © The Electrochemical Society.

R.D.L. Smith, P.G. Pickup, Nitrogen-rich polymers for the electrocatalytic reduction of CO2, Electrochem. Commun. (2010), doi:10.1016/j.elecom.2010.10.013.

B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.

Nogami, Itagaki, and Shiratsuchi; Pulsed Electroreduction of CO2 on Copper Electrodes-II; J. Electrochem. Soc., vol. 141, No. 5, May 1994 © The Electrochemical Society, Inc., pp. 1138-1142.

Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.

Kotaro Ogura Kenichi Mine, Jun Yano, and Hideaki Sugihara; Electrocatalytic Generation of C2 and C3 Compounds from Carbon Dioxide on a Cobalt Complex-immobilized Dual-film Electrode; J . Chem. Soc., Chem. Commun., 1993, pp. 20-21.

Ohkawa, Noguchi, Nakayama, Hashimoto, and Fujishima; Electrochemical reduction of carbon dioxide on hydrogen-storing materials Part 3. The effect of the absorption of hydrogen on the palladium electrodes modified with copper; Journal of Electroanalytical Chemistry, 367 (1994) 165-173.

Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.

D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.

Bruce A. Parkinson & Paul F. Weaver, Photoelectrochemical pumping of enzymatic CO2 reduction, Nature, vol. 309, May 10, 1984, pp. 148-149.

Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.

Furuya, Yamazaki, and Shibata; High performance Ru-Pd catalysts for CO2 reduction at gas-diffusion electrodes, Journal of Electroanalytical Chemistry 431 (1997) 39-41.

Petit, Chartier, Beley, and Deville; Molecular catalysts in photoelectrochemical cells Study of an efficient system for the selective photoelectroreduction of CO2: p-GaP or p-GaAs / Ni( cyclam) 2+, aqueous medium; J. Electroanal. Chem., 269 (1989) 267-281; Elsevier Sequoia S.A., Lausanne—Printed in The Netherlands.

Popic, Avramov-Ivic, and Vukovic; Reduction of carbon dioxide on ruthenium oxide and modified ruthenium oxide electrodes in 0.5 M NaHCO3, Journal of Electroanalytical Chemistry 421 (1997) 105-110.

Whipple and Kenis, Prospects of CO2 Utilization via Direct Heterogeneous Electrochemical Reduction, J. Phys. Chem. Lett. 2010, 1, 3451-3458, © 2010 American Chemical Society.

P.A. Christensen & S.J. Higgins, Preliminary note The electrochemical reduction of CO2 to oxalate at a Pt electrode immersed in acetonitrile and coated with polyvinylalcohol/[Ni(dppm)2Cl2], Journal of Electroanalytical Chemistry, 387 (1995) 127-132.

Qu, Zhang, Wang, and Xie; Electrochemical reduction of CO2 on RuO2/TiO2 nanotubes composite modified Pt electrode, Electrochimica Acta 50 (2005) 3576-3580.

Jin, Gao, Jin, Zhang, Cao, ; Wei, and Smith; High-yield reduction of carbon dioxide into formic acid by zero-valent metal/metal oxide redox cycles; Energy Environ. Sci., 2011, 4, pp. 881-884.

Yu B Vassiliev, V S Bagotzky. N V Osetrova and A A Mikhailova; Electroreduction of Carbon Dioxide Part III. Adsorption and Reduction of CO2 on Platinum Metals; J Electroanal Chem. 189 (1985) 311-324, Elsevier Sequoia SA, Lausanne—Printed in The Netherlands.

M. Gattrell, N. Gupta, and A. Co; A review of the aqueous electrochemical reduction of CO2 to hydrocarbons at copper; Journal of Electroanalytical Chemistry 594 (2006) 1-19.

Hoshi, Ito, Suzuki, and Hori; Preliminary note CO 2 Reduction on Rh single crystal electrodes and the structural effect; Journal of Electroanalytical Chemistry 395 (1995) 309-312.

Rudolph, Dautz, and Jager; Macrocyclic [N42-] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.

Ryu, Andersen, and Eyring; The Electrode Reduction Kinetics of Carbon Dioxide in Aqueous Solution; The Journal of Physical Chemistry, vol. 76, No. 22, 1972, pp. 3278-3286.

Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.

Schwartz, Cook, Kehoe, MacDuff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.

Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.

Seshadri, Lin, and Bocarsly; A new homogeneous electrocatalyst for the reduction of carbon dioxide to methanol at low overpotential; Journal of Electroanalytical Chemistry, 372 (1994) 145-150.

Shiratsuchi, Aikoh, and Nogami; Pulsed Electroreduction of CO2 on Copper Electrodes; J, Electrochem. Soc., vol. 140, No. 12, Dec. 1993 © The Electrochemical Society, Inc.

Centi & Perathoner; Towards Solar Fuels from Water and CO2; ChemSusChem 2010, 3, 195-208, © 2010 Wiley-VCH Verlag GmbH& Co. KGaA, Weinheim.

David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.

Isao Taniguchi, Benedict Aurian-Blajeni and John O'M. Bockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.

Isao Taniguchi, Benedict Aurian-Blajeni and John O'M. Bockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.

Hiroshi Yoneyama, Kenji Sugimura and Susumu Kuwabata; Effects of Electrolytes on the Photoelectrochemical Reduction of Carbon Dioxide at Illuminated p-Type Cadmium Telluride and p-Type Indium Phosphide Electrodes in Aqueous Solutions; J. Electroanal. Chem., 249 (1988) 143-153, Elsevier Sequoia ,S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010).

YLB Vassiliev, V S Bagotzky, N V. Osetrov, O.A. Khazova and NA Mayorova; Electroreduction of Carbon Dioxide Part I. The Mechanism and Kinetics of Electroreduction of CO2 in Aqueous Solutions on Metals with High and Moderate Hydrogen Overvoltages; J Electroanal. Chem. 189 (1985) 271-294, Elsevier Sequoia SA , Lausanne—Printed in The Netherlands.

YLB Vassiliev, V S Bagotzky, N V. Osetrov, O.A. Khazova and NA Mayorova; Electroreduction of Carbon Dioxide Part II. The Mechanism of Reduction in Aprotic Solvents; J Electroanal. Chem. 189 (1985) 295-309, Elsevier Sequoia SA , Lausanne—Printed in The Netherlands.

Watanabe, Shibata, Kato, Azuma, and Sakata; Design of Alloy Electrocatalysts for C02 Reduction III. The Selective and Reversible Reduction of C02 on Cu Alloy Electrodes; J. Electrochem. Soc., vol. 138, No. 11, Nov. 1991 © The Electrochemical Society, Inc., pp. 3382-3389.

Soichiro Yamamura, Hiroyuki Kojima, Jun Iyoda and Wasaburo Kawai; Photocatalytic Reduction of Carbon Dioxide with Metal-Loaded SiC Powders; J. Eleciroanal. Chem., 247 (1988) 333-337, Elsevier Sequoia S.A., Lausanne—Printed in The Netherlands.

R. Piercy, N. A. Hampson; The electrochemistry of indium, Journal of Applied Electrochemistry 5 (1975) 1-15, Printed in Great Britain, © 1975 Chapman and Hall Ltd.

C. K. Watanabe, K. Nobe; Electrochemical behaviour of indium in H2S04, Journal of Applied Electrochemistry 6 (1976) 159-162, Printed in Great Britain, © 1976 Chapman and Hall Ltd.

Yumi Akahori, Nahoko Iwanaga,Yumi Kato, Osamu Hamamoto, and Mikita Ishii; New Electrochemical Process for CO2 Reduction to from Formic Acid from Combustion Flue Gases; Electrochemistry; vol. 72, No. 4 (2004), pp. 266-270.

Hamamoto, Akahori, Goto, Kato, and Ishii; Modified Carbon Fiber Electrodes for Carbon Dioxide Reduction; Electrochemistry, vol. 72, No. 5 (2004), pp. 322-327.

S. Omanovicâ, M. Metikosï-Hukovic; Indium as a cathodic material: catalytic reduction of formaldehyde; Journal of Applied Electrochemistry 27 (1997) 35-41.

Hara, Kudo, and Sakata; Electrochemical reduction of carbon dioxide under high pressure on various electrodes in an aqueous electrolyte; Journal of Electroanalytical Chemistry 391 (1995) 141-147.

Hori, Kikuchi, and Suzuki; Production of CO and CH4 in Electrochemical Reduction of CO2 at Metal Electrodes in Aqueous Hydrogencarbonate Solution; Chemistry Letters, pp. 1695-1698, 1985. (C) 1985 The Chemical Society of Japan.

Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.

Kaneco, Iwao, Iiba, Itoh, Ohta, and Mizuno; Electrochemical Reduction of Carbon Dioxide on an Indium Wire in a KOH/Methanol-Based Electrolyte at Ambient Temperature and Pressure; Environmental Engineering Science; vol. 16, No. 2, 1999, pp. 131-138.

Todoroki, Hara, Kudo, and Sakata; Electrochemical reduction of high pressure CO2 at Pb, Hg and In electrodes in an aqueous KHCO3 solution; Journal of Electroanalytical Chemistry 394 (1995) 199-203.

R.P.S. Chaplin and A.A. Wragg, Effects of process conditions and electrode material on reaction pathways for carbon dioxide electroreduction with particular reference to formate formation, Journal of Applied Electrochemistry 33: 1107-1123, 2003, Copyright 2003 Kluwer Academic Publishers. Printed in The Netherlands.

Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.

M. N. Mahmood, D. Masheder, and C. J. Harty; Use of gas-diffusion electrodes for high-rate electrochemical reduction of carbon dioxide. I. Reduction at lead, indium- and tin-impregnated electrodes; Journal of Applied Electrochemistry 17 (1987) 1159-1170.

Yoshio Hori, Hidetoshi Wakebe, Toshio Tsukamoto and Osamu Koga; Electrocatalytic Process of CO Selectivity in Electrochemical Reduction of CO2 at Metal Electrodes in Aqueous Media; Electrochimica Acta, vol. 39, No. 11/12, pp. 1833-1839, 1994, Copyright 1994 Elsevier Science Ltd., Printed in Great Britain.

Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 The Chemical Society of Japan.

Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.

Vassiliev, Bagotzky, Khazova, and Mayorova; Electroreduction of Carbon Dioxide, Part II. The Mechanism of Reduction in Aprotic Solvents, J. Electroanal. Chem. 189 (1985) 295-309, Elsevier Sequoia S.A., Lausanne—Printed in The Netherlands.

Vassiliev, Bagotzky, Khazova, and Mayorova; Electroreduction of Carbon Dioxide, Part I. The Mechanism and Kinetics of Electroreduction of $CO_2$ in Aqueous Solutions on Metals with High and Moderate Hydrogen Overvoltages, J. Electroanal. Chem. 189 (1985) 271-294, Elsevier Sequoia S.A., Lausanne—Printed in The Netherlands.

Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522.

Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.

F. Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.

Sammells and Cook, Electrochemical and Electrocatalytic Reactions of Carbon Dioxide—Chapter 7: Electrocatalysis and Novel Electrodes for High Rate $CO_2$ Reduction Under Ambient Conditions, Elsevier, Amsterdam, 1993, pp. 217-262.

W.W. Frese, Jr., Electrochemical and Electrocatalytic Reactions of Carbon Dioxide—Chapter 6: Electrochemical Reduction of $CO_2$ at Solid Electrodes, Elsevier, Amsterdam, 1993, pp. 145-215.

Halmann and Steinberg, Greenhouse gas carbon dioxide mitigation: science and technology—Chapter 11: Photochemical and Radiation-Induced Activation of $CO_2$ in Homogeneous Media, CRC Press, 1999, pp. 391-410.

Halmann and Steinberg, Greenhouse gas carbon dioxide mitigation: science and technology—Chapter 12: Electrochemical Reduction of $CO_2$, CRC Press, 1999, pp. 411-515.

Halmann and Steinberg, Greenhouse gas carbon dioxide mitigation: science and technology—Chapter 13: Photoelectrochemical Reduction of $CO_2$, CRC Press, 1999, pp. 517-527.

Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem.org.

Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.

Hui Li and Colin Oloman, Development of a continuous reactor for the electro-reduction of carbon dioxide to formate—Part 2: Scale-up, J Appl Electrochem (2007) 37:1107-1117.

Hui Li and Colin Oloman, The electro-reduction of carbon dioxide in a continuous reactor, Journal of Applied Electrochemistry (2005) 35:955-965, Copyright Springer 2005.

PCT International Search Report dated Dec. 13, 2011, PCT/US11/45515, 2 pages.

Andrew P. Doherty, Electrochemical reduction of butraldehyde in the presence of $CO_2$, Electrochimica Acta 47 (2002) 2963-2967, Copyright 2002 Elsevier Science Ltd.

PCT International Search Report dated Dec. 15, 2011, PCT/US11/45521, 2 pages.

Fan et al., Semiconductor Electrodes. 27. The p- and n-GaAs-N, N?—Dimet h yl-4,4'-bipyridinium System. Enhancement of Hydrogen Evolution on p-GaAs and Stabilization of n-GaAs Electrodes, Journal of the American Chemical Society, vol. 102, Feb. 27, 1980, pp. 1488-1492.

PCT International Search Report dated Jun. 23, 2010, PCT/US10/22594, 2 pages.

Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Co. KGaA, Weinheim, 26 pages.

Barton Cole, Lakkaraju, Rampulla, Morris, Abelev, and Bocarsly; Using a One-Electron Shuttle for the Multielectron Reduction of $CO_2$ to Methanol: Kinetic, Mechanistic, and Structural Insights; Mar. 29, 2010, 13 pages.

Morris, McGibbon, and Bocarsly; Electrocatalytic Carbon Dioxide Activation: The Rate-Determining Step of Pyridinium-Catalyzed $CO_2$ Reduction; ChemSusChem 2011, 4, 191-196, Copyright 2011 Wiley-VCH Verlag GmbH& Co. KGaA, Weinheim.

Emily Barton Cole, Pyridinium-Catalyzed Electrochemical and Photoelectrochemical Conversion of $CO_2$ to Fuels: A Dissertation Presented to the Faculty of Princeton University in Candidacy for the Degree of Doctor of Philosophy, Nov. 2009, pp. 1-141.

Barton, Rampulla, and Bocarsly; Selective Solar-Driven Reduction of $CO_2$ to Methanol Using a Catalyzed p-GaP Based Photoelectrochemical Cell; Oct. 3, 2007, 3 pages.

Mostafa Hossain, Nagaoka, and Ogura; Palladium and cobalt complexes of substituted quinoline, bipyridine and phenanthroline as catalysts for electrochemical reduction of carbon dioxide; Electrochimica Acta, vol. 42, No. 16, pp. 2577-2585, 1997.

Keene, Creutz, and Sutin; Reduction of Carbon Dioxide by Tris(2,2'-Bipyridine)Cobalt(I), Coordination Chemistry Reviews, 64 (1995) 247-260, Elsevier Science Publishers B.V., Amsterdam—Printed in The Netherlands.

Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.

Tan, Zou, and Hu; Photocatalytic reduction of carbon dioxide into gaseous hydrocarbon using $TiO_2$ pellets; Catalysis Today 115 (2006) 269-273.

Bandi and Kuhne, Electrochemical Reduction of Carbon Dioxide in Water: Analysis of Reaction Mechanism on Ruthenium-Titanium-Oxide, J. Electrochem. Soc., vol. 139, No. 6, Jun. 1992 (C) The Electrochemical Society, Inc., pp. 1605-1610.

B. Beden, A. Bewick and C. Lamy, A Study by Electrochemically Modulated Infrared Reflectance Spectroscopy of the Electrosorption of Formic Acid At a Platinum Electrode, J. Electroanal. Chem., 148 (1983) 147-160, Elsevier Sequoia S.A., Lausanne—Printed in The Netherlands.

Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.

Bian, Sumi, Furue, Sato, Kolke, and Ishitani; A Novel Tripodal Ligand, Tris[(4'-methyl-2,2'-bipyridyl-4-yl)-methyl]carbinol and Its Trinuclear RuII/ReI Mixed-Metal Complexes: Synthesis, Emission Properties, and Photocatalytic $CO_2$ Reduction; Inorganic Chemistry, vol. 47, No. 23, 2008, pp. 10801-10803.

T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).

D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.

Arakawa, et al., Catalysis Research of Relevance to Carbon Management: Progress, Challenges, and Opportunities, Chem. Rev. 2001, 101, 953-996.

Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.

S. Clarke and J. A. Harrison, The Reduction of Formaldehyde, Electroanalytical Chemistry and Interfacial Electrochemistry, J. Electroanal. Chem., 36 (1972), pp. 109-115, Elsevier Sequoia S.A., Lausanne Printed in The Netherlands.

Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.

Hara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.

Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.

Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.

Doherty, "Electrochemical Reduction of Butyraldehyde in the Presence of CO2", Electrochimica Acta 47(2002) 2963-2967.

Jitaru, Maria, "Electrochemical Carbon Dioxide Reduction"—Fundamental and Applied Topics (Review), Journal of the University of Chemical Technology and Metallurgy (2007), vol. 42, No. 4, pp. 333-344.

Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.

Shibata, Masami, et al., "Simultaneous Reduction of Carbon Dioxide and Nitrate Ions at Gas-Diffusion Electrodes with Various Metallophthalocyanine Catalysts", From a paper presented at the 4th International Conference on Electrocatalysis: From Theory to Industrial Applications', Sep. 22-25, 2002, Como, Italy, Electrochimica Acta 48 (2003) 3959-3958.

Harrison et al., "The Electrochemical Reduction of Organic Acids", Electroanalytical Chemistry and Interfacial Electrochemistry (no month, 1971), vol. 32, No. 1, pp. 125-135.

Chauhan et al., "Electro Reduction of Acetophenone in Pyridine on a D.M.E.", J Inst. Chemists (India) [Jul. 1983], vol. 55, No. 4, pp. 147-148.

Hori et al, chapter on "Electrochemical CO2 Reduction on Metal Electrodes," in the book Modern Aspects of Electrochemistry, vol. 42, pp. 106 and 107.

Czerwinski et al, "Adsorption Study of CO2 on Reticulated Vitreous Carbon (RVC) covered with Platinum," Analytical Letters, vol. 18, Issue 14 (1985), pp. 1717-1722.

Jitaru, Lowy, Toma, Toma and Oniciu, "Electrochemical Reduction of Carbon Dioxide on Flat Metallic Cathodes," Journal of Applied Electrochemistry, 1997, vol. 27, p. 876.

Popic, Avramov, and Vukovic, "Reduction of Carbon Dioxide on Ruthenium Oxide and Modified Ruthenium Oxide Electrodes in 0.5M NaHCO3," Journal of Electroanalytical Chemistry, 1997, vol. 421, pp. 105-110.

Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.

Kostecki and Augustynski, "Electrochemical Reduction of CO2 at an Active Silver Electrode," Ber. Busenges. Phys. Chem., 1994, vol. 98, pp. 1510-1515.

Non-Final Office Action for U.S. Appl. No. 12/846,221, dated Nov. 21, 2012.

Non-Final Office Action for U.S. Appl. No. 12/846,011, dated Aug. 29, 2012.

Non-Final Office Action for U.S. Appl. No. 12/846,002, dated Sep. 11, 2012.

Non-Final Office Action for U.S. Appl. No. 12/845,995, dated Aug. 13, 2012.

Final Office Action for U.S. Appl. No. 12/845,995, dated Nov. 28, 2012.

Non-Final Office Action for U.S. Appl. No. 12/696,840, dated Jul. 9, 2012.

Non-Final Office Action for U.S. Appl. No. 13/472,039, dated Sep. 13, 2012.

DNV (Det Norske Veritas), Carbon Dioxide Utilization, Electrochemical Conversion of CO2—Opportunities and Challenges, Research and Innovation, Position Paper, Jul. 2011.

Matthew R. Hudson, Electrochemical Reduction of Carbon Dioxide, Department of Chemistry, State University of New York at Potsdam, Potsdam New York 13676, pp. 1-15, Dec. 9, 2005.

Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.

R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123, 2003; © 2003 Kluwer Academic Publishers. Printed in the Netherlands.

Akahori, Iwanaga, Kato, Hamamoto, Ishii; New Electrochemical Process for CO2 Reduction to from Formic Acid from Combustion Flue Gases; Electrochemistry; vol. 4; pp. 266-270.

Ali, Sato, Mizukawa, Tsuge, Haga, Tanaka; Selective formation of HCO2- and C2O42—in electrochemical reduction of CO2 catalyzed by mono- and di-nuclear ruthenium complexes; Chemistry Communication; 1998; in Cambridge, UK, Oct. 13, 1997; 7/07363A; pp. 249-250.

Wang, Maeda, Thomas, Takanabe, Xin, Carlsson, Domen, Antonietti; A metal-free polymeric photocatalyst for hydrogen production from water under visible light; Nature Materials; Published Online Nov. 9, 2008; www.nature.com/naturematerials; pp. 1-5.

Aresta and Dibenedetto; Utilisation of CO2 as a Chemical Feedstock: Opportunities and Challenges; Dalton Transactions; 2007; pp. 2975-2992; © The Royal Society of Chemistry 2007.

B. Aurian-Blajeni, I. Taniguchi, and J. O'M. Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.

Azuma, Hashimoto, Hiramoto, Watanabe, Sakata; Electrochemical Reduction of Carbon Dioxide on Various Metal Electrodes in Low-Temperature Aqueous KHCO3 Media; J. Electrochem. Soc., vol. 137, No. 6, Jun. 1990 © The Electrochemical Society, Inc.

Bandi and Kuhne; Electrochemical Reduction of Carbon Dioxide in Water: Analysis of Reaction Mechanism on Ruthenium-Titanium-Oxide; J. Electrochem. Soc., vol. 139, No. 6, Jun. 1992 © The Electrochemical Society, Inc.

Beley, Collin, Sauvage, Petit, Chartier; Photoassisted Electro-Reduction of CO2 on p-GaAs in the Presence of Ni Cyclam; J. Electroanal. Chem. vol. 206, 1986, pp. 333-339, Elsevier Sequoia S.A., Lausanne, Printed in The Netherlands.

Benson, Kubiak, Sathrum, and Smieja; Electrocatalytic and homogeneous approaches to conversion of CO2 to liquid fuels; Chem. Soc. Rev., 2009, vol. 38, pp. 89-99, © The Royal Society of Chemistry 2009.

Taniguchi, Adrian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia S.A., Lausanne—Printed in The Netherlands.

Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.

Carlos R. Cabrera and Hector D. Abruna; Electrocatalysis of CO2 Reduction at Surface Modified Metallic and Semiconducting Electrodes; J. Electroanal. Chem. vol. 209, 1986, pp. 101-107, Elesevier Sequoia S.A., Lausanne—Printed in The Netherlands, © 1986 Elsevier Sequoia S.A.

D. Canfield and K.W. Frese, Jr.; Reduction of Carbon Dioxide to Methanol on n- and p-GaAs and p-InP. Effect of Crystal Face, Electrolyte and Current Density; Journal of the Electrochemical Society; Aug. 1983; pp. 1772-1773.

Huang, Lu, Zhao, Li, and Wang; The Catalytic Role of N-Heterocyclic Carbene in a Metal-Free Conversion of Carbon Dioxide into Methanol: A Computational Mechanism Study; J. Am. Chem. Soc. 2010, vol. 132, pp. 12388-12396, © 2010 American Chemical Society.

Arakawa, et al., Catalysis Research of Relevance to Carbon Management: Progress, Challenges, and Opportunities; Chem. Rev. 2001, vol. 101, pp. 953-996.

Cheng, Blaine, Hill, and Mann; Electrochemical and IR Spectroelectrochemical Studies of the Electrocatalytic Reduction of Carbon Dioxide by [Ir2(dimen)4]2+ (dimen=1,8-Diisocyanomenthane), Inorg. Chem. 1996, vol. 35, pp. 7704-7708, © 1996 American Chemical Society.

Stephen K. Ritter; What Can We Do With Carbon Dioxide?, Chemical & Engineering News, Apr. 30, 2007, vol. 85, No. 18, pp. 11-17, http://pubs.acs.org/cen/coverstory/85/8518cover.html.

J. Beck, R. Johnson, and T. Naya; Electrochemical Conversion of Carbon Dioxide to Hydrocarbon Fuels, EME 580 Spring 2010, pp. 1-42.

Aydin and Koleli, Electrochemical reduction of CO2 on a polyaniline electrode under ambient conditions and at high pressure in methanol, Journal of Electroanalytical Chemistry vol. 535 (2002) pp. 107-112, www.elsevier.com/locate/jelechem.

Lee, Kwon, Machunda, and Lee; Electrocatalytic Recycling of CO2 and Small Organic Molecules; Chem. Asian J. 2009, vol. 4, pp. 1516-1523, © 2009 Wiley-VCH Verlag GmbH&Co. KGaA, Weinheim.

Etsuko Fujita, Photochemical CO2 Reduction: Current Status and Future Prospects, American Chemical Society's New York Section, Jan. 15, 2011, pp. 1-29.

Toshio Tanaka, Molecular Orbital Studies on the Two-Electron Reduction of Carbon Dioxide to Give Formate Anion, Memiors of Fukui University of Technology, vol. 23, Part 1, 1993, pp. 223-230.

A. Bewick and G.P. Greener, The Electroreduction of CO2 to Glycollate on a Lead Cathode, Tetrahedron Letters No. 5, pp. 391-394, 1970, Pergamon Press, Printed in Great Britain.

Centi, Perathoner, Wine, and Gangeri, Electrocatalytic conversion of CO2 to long carbon-chain hydrocarbons, Green Chem., 2007, vol. 9, pp. 671-678, © The Royal Society of Chemistry 2007.

A. Bewick and G.P. Greener, The Electroreduction of CO2 to Malate on a Mercury Cathode, Tetrahedron Letters No. 53, pp. 4623-4626, 1969, Pergamon Press, Printed in Great Britain.

Eggins, Brown, McNeill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.

Shibata et al., "Simultaneous Reduction of Carbon Dioxide and Nitrate Ions at Gas-Diffusion Electrodes with Various Metallophthalocyanine Catalysts", Electrochima Acta (no month, 2003), vol. 48, pp. 3953-3958.

Scibioh et al., "Electrochemical Reduction of Carbon Dioxide: A Status Report", Proc Indian Natn Sci Acad (May 2004), vol. 70, A, No. 3, pp. 407-462.

Shibata et al., "Electrochemical Synthesis of Urea at Gas-Diffusion Electrodes", J. Electrochem. Soc. (Jul. 1998), vol. 145, No. 7, pp. 2348-2353.

Non-Final Office Action for U.S. Appl. No. 12/875,227, dated Dec. 11, 2012.

Green et al., "Vapor-Liquid Equilibria of Formaldehyde-Methanol-Water", Industrial and Engineering Chemistry (Jan. 1955), vol. 47, No. 1, pp. 103-109.

Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.

Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).

Heldebrant et al., "Reversible Zwitterionic Liquids, The Reaction of Alkanol Guanidines, Alkanol Amidines, and Diamines wih CO2", Green Chem. (mo month, 2010), vol. 12, pp. 713-721.

Perez et al., "Activation of Carbon Dioxide by Bicyclic Amidines", J. Org. Chem. (no month, 2004), vol. 69, pp. 8005-8011.

* cited by examiner

| PRODUCT | SYSTEM | CATALYST CONCENTRATION | ELECTROLYTE CONCENTRATION | CATHODE POTENTIAL | pH |
|---|---|---|---|---|---|
| FORMIC ACID | Sn/IMIDAZOLE/KCl OR STAINLESS STEEL/ IMIDAZOLE/CsCl SUBSTITUTED IMIDAZOLES, THIAZOLES, AND ADENINE ALSO EFFECTIVE | 10 TO 100mM | 0.25 TO 1M | -0.8 TO -1.4 | 4-8 |
| OXALIC ACID | FERRITIC STEEL/ IMIDAZOLE/$CaCl_2$ | 10mM TO 100mM | 0.25 TO 1M | -0.8 TO -1.2 | 5-7 |
| GLYOXYLIC ACID | FERRITIC STEEL/ IMIDAZOLE/KCl | 10mM TO 100mM | 0.25 TO 1M | -0.8 TO -1.2 | 5-7 |

FIG. 7

PURIFICATION OF CARBON DIOXIDE FROM A MIXTURE OF GASES

CROSS REFERENCE TO RELATED APPLICATIONS

This application claims benefit to U.S. Provisional Application Ser. No. 61/315,665, filed Mar. 19, 2010, which is hereby incorporated by reference in its entirety.

FIELD OF THE INVENTION

The present invention relates to gas purification generally and, more particularly, to a method and/or apparatus for implementing purification of carbon dioxide from a mixture of gases.

BACKGROUND OF THE INVENTION

The combustion of fossil fuels in activities such as the electricity generation, transportation, and manufacturing produces billions of tons of carbon dioxide annually. Research since the 1970s indicates increasing concentrations of carbon dioxide in the atmosphere may be responsible for altering the Earth's climate, changing the pH of the ocean and other potentially damaging effects. Countries around the world, including the United States, are seeking ways to mitigate emissions of carbon dioxide.

In order to capture carbon dioxide from industrial sources, such as a coal-fired power plant, the carbon dioxide is separated from flue gases, which are primarily nitrogen and water and include other trace gases, metals and particulates. Previous work in the field has many limitations, in particular the energy consumed in separating the carbon dioxide from the other gases and the amount of water used in the separation. A common technique currently available uses monoethyl amine (MEA) adsorption of the carbon dioxide from the flue gases. However, the technique utilizes high temperature steam to effectively separate the carbon dioxide from the amine. As such, the technique can consume as much as 30% of the energy generated at a coal-fired power plant. Furthermore, carbon dioxide capture increases both the amount of water that is brought into a power plant and the amount of water evaporated into the atmosphere by the power plant. Adding the carbon dioxide capture can increase the water brought into the power plant by 2300 to 4500 liters per megawatt-hour. Increased water evaporation from the power plant due to the carbon dioxide capture can range from 1900 to 3400 liters per megawatt-hour.

Work has also been done on electrochemical systems, such as electrodialysis via carbonates, to separate the carbon dioxide from the other gases. The electrochemical systems have slow kinetics and low efficiency making the systems uneconomical. Membrane separation of the carbon dioxide is possible, but no effective membranes have been made to date. Carbon dioxide is also removed by cooling the flue gas until dry ice is formed. However, the energy used in the process is higher than for amine adsorption.

Existing processes incorporating ethyl amines or other absorbents use large quantities of energy and water that make such techniques uneconomical. Membrane systems lack the strength and/or stability to last for long periods of time. Membrane systems and electrodialysis systems also have slow rates of reaction making upscaling difficult economically.

SUMMARY OF THE INVENTION

The present invention concerns a method for purification of carbon dioxide from a mixture of gases. The method generally includes steps (A) and (B). Step (A) may bubble the gases into a solution of an electrolyte and a catalyst in an electrochemical cell. The electrochemical cell may include an anode in a first cell compartment and a cathode in a second cell compartment. The cathode generally reduces the carbon dioxide into one or more compounds. The anode may oxidize at least one of the compounds into the carbon dioxide. Step (B) may separate the carbon dioxide from the solution.

The objects, features and advantages of the present invention include providing a method and/or apparatus for implementing purification of carbon dioxide from a mixture of gases that may (i) utilize lower amounts of energy than conventional techniques, (ii) provide reaction rates sufficiently high for scalability, (iii) provide stabile long-term reduction of carbon dioxide using copper-based alloys electrodes, (iv) provide for commercialization of electrochemical purification of carbon dioxide from a mixed gas and/or (v) consume little to no water in the purification chemistry.

BRIEF DESCRIPTION OF THE DRAWINGS

These and other objects, features and advantages of the present invention will be apparent from the following detailed description and the appended claims and drawings in which:

FIG. 7 is a table illustrating relative product yields for different cathode material, catalyst, electrolyte, pH level and cathode potential combinations.

DETAILED DESCRIPTION OF THE PREFERRED EMBODIMENTS

Figure 1:
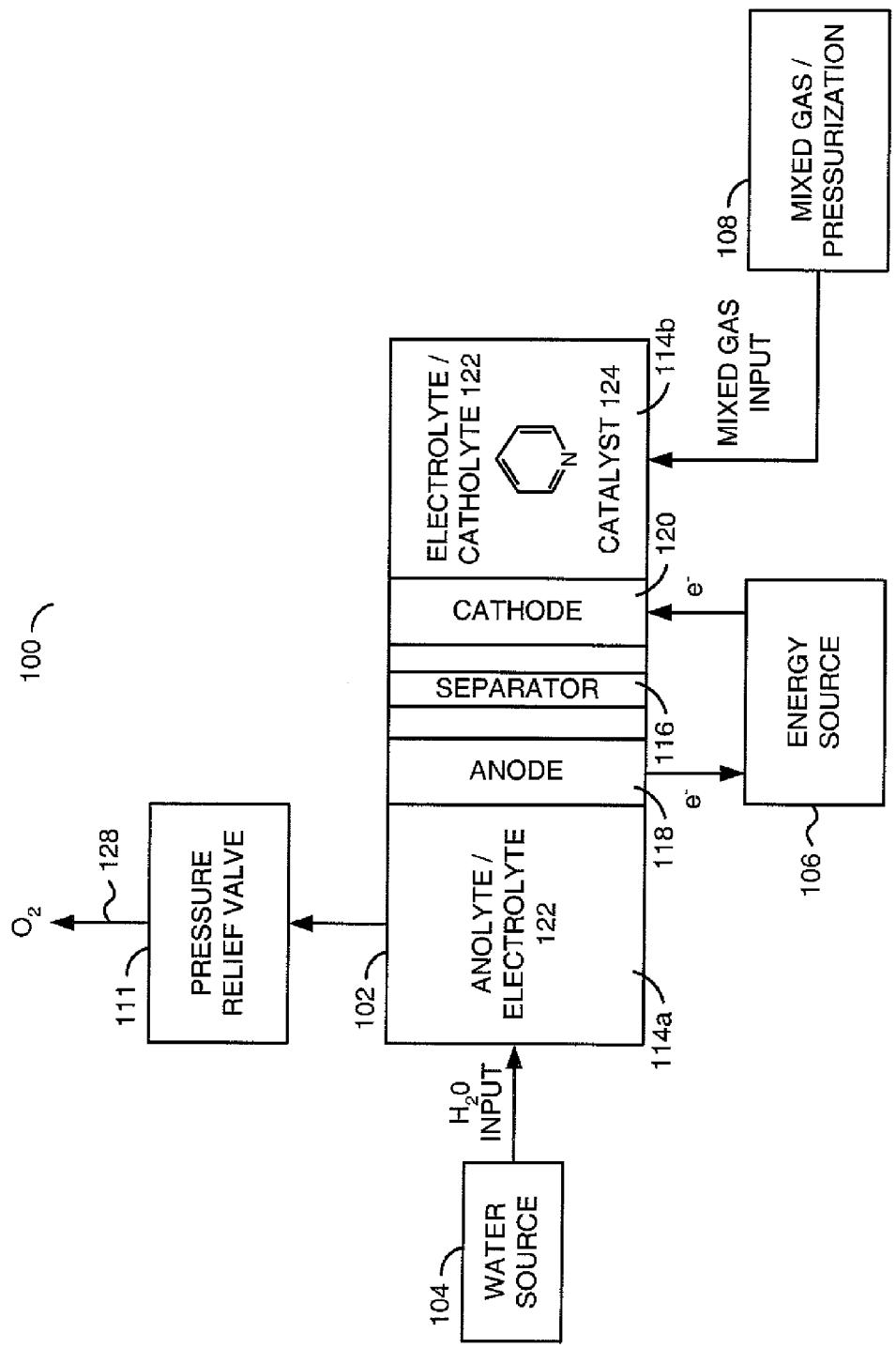
FIG. 1 is a block diagram of a system in accordance with a preferred embodiment of the present invention.

Before any embodiments of the invention are explained in detail, it is to be understood that the embodiments may not be limited in application per the details of the structure or the function as set forth in the following descriptions or illustrated in the figures of the drawing. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage.

In the following description of methods, process steps may be carried out over a range of temperatures (e.g., approximately 10° C. (Celsius) to 50° C.) and a range of pressures (e.g., approximately 1 to 10 atmospheres) unless otherwise specified. Numerical ranges recited herein generally include all values from the lower value to the upper value (e.g., all possible combinations of numerical values between the lowest value and the highest value enumerated are considered expressly stated). For example, if a concentration range or beneficial effect range is stated as 1% to 50%, it is intended that values such as 2% to 40%, 10% to 30%, or 1% to 3%, etc., are expressly enumerated. The above may be simple examples of what is specifically intended.

Some embodiments of the present invention generally separate carbon dioxide from a mixture of gases using a reduction and oxidation process. The carbon dioxide may be isolated from the mixed gas by reducing the carbon dioxide to one or more compounds at a cathode. The compounds may include, but are not limited to oxalate, oxalate salts and/or organic acids. The organic acids may include, but are not limited to, oxalic acid, formic acid and glyoxylic acid. The compounds may be oxidized to form carbon dioxide at an anode. The resulting pure, or nearly pure, carbon dioxide may be subsequently collected for storage and/or other uses.

The formation of oxalate may be maximized in some embodiments. Evolution of oxalate from carbon dioxide may be achieved with a single electron per carbon atom. The evolution of other organic molecules generally involves two or more electrons per carbon atom. Therefore, the amount of electrical energy used to make oxalate may be smaller than other organic molecules.

The purification of the carbon dioxide may be achieved efficiently in a divided electrochemical cell in which (i) a compartment contains an anode and (ii) another compartment contains a working cathode electrode and a catalyst. The compartments may be separated by an optional porous glass frit or other ion conducting bridge. Both compartments generally contain an aqueous solution of an electrolyte. A mixed gas containing the carbon dioxide may be continuously bubbled through the cathodic electrolyte solution to saturate the solution.

The mixed gas may be obtained from any sources (e.g., an exhaust stream from fossil-fuel burning power or industrial plants, from geothermal or natural gas wells or the atmosphere itself). Generally, the mixed gases may be obtained from concentrated point sources of generation prior to being released into the atmosphere. For example, high concentration carbon dioxide generally exists in flue gases of fossil fuel (e.g., coal, natural gas, oil, etc.) burning power plants. Emissions from varied industries, including geothermal wells, may also be captured on-site.

Referring to FIG. 1, a block diagram of a system 100 is shown in accordance with a preferred embodiment of the present invention. The system (or apparatus) 100 generally comprises a cell (or container) 102, a liquid source 104, a power source 106, a gas source 108 and an optional valve 111. An output gas may be presented from the cell 102 at the valve 111.

The cell 102 may be implemented as a divided cell or an undivided cell. The divided cell may be a divided electrochemical cell and/or a divided photochemical cell. The cell 102 is generally operational to separate carbon dioxide ($CO_2$) from a mixture of gases. The purification generally takes place by bubbling the mixed gases into an aqueous solution of an electrolyte in the cell 102. A cathode in the cell 102 may reduce the carbon dioxide and protons into the one or more compounds. An anode in the cell 102 generally oxidizes the compounds back into the carbon dioxide.

The cell 102 generally comprises one or more compartments (or chambers) 114a-114b, an optional separator (or membrane) 116, an anode 118 and a cathode 120. The anode 118 may be disposed in a given compartment (e.g., 114a). The cathode 120 may be disposed in another compartment (e.g., 114b) on an opposite side of the separator 116 as the anode 118. An aqueous solution 122 may fill all of the compartments 114a-114b. A catalyst 124 may be added to the compartment 114b containing the cathode 120.

The liquid source 104 may implement a water source. The liquid source 104 may be operational to provide pure water to the cell 102.

The power source 106 may implement a variable voltage source. The source 106 may be operational to generate an electrical potential between the anode 118 and the cathode 120. The electrical potential may be a DC voltage. In some embodiments, a range of the electrical potential may be between −0.7 volts and −1 volt.

The gas source 108 may implement a mixed gas source. The source 108 is generally operational to provide a mixture of gasses, including carbon dioxide to the cell 102. The source 108 may also be operational to pressurize the cell 102. In some embodiments, the gas is bubbled directly into the compartment 114b containing the cathode 120.

The valve 111 may be implemented as a pressure relief valve. In a pressurized type of cell 102, the valve 111 may be used at a point outside the cell 102. While the valve 111 is closed, the carbon dioxide may be trapped in the cell 102. While the valve 111 is open, pressurized carbon dioxide gas may leave the cell 102 through a port 128. Pressure in the cell 102 generally allows the pressurized carbon dioxide gas to separate from the electrolyte 122. In an unpressurized type of cell 102, bubbles of carbon dioxide generally form at the anode 118 when concentrations of the carbon dioxide exceed a threshold (e.g., approximately 33 millimolar (mM) at 25° C.). The resulting carbon dioxide gas may leave the cell 102 through the port 128.

In the process described, the carbon dioxide is reduced to one or more compounds (e.g., oxalate, oxalate salts and/or organic acids) at the cathode 120 while the compounds may be oxidized back into carbon dioxide at the anode 118. The electrolyte 122 in the cell 102 may use water as a solvent with any salts that are water soluble and with a heterocycle catalyst 124. The electrolyte 122 in the cell 102 may use water as a solvent with any salts that are water soluble and with a pyridine or pyridine-derived catalyst 124. The catalysts 124 may include, but are not limited to, nitrogen, sulfur and oxygen containing heterocycles. Examples of the heterocyclic compounds may be pyridine, imidazole, pyrrole, thiazole, furan, thiophene and the substituted heterocycles such as aminothiazole and benzimidazole. Cathode materials generally include any conductor. Any anode material with a low overpotential for oxidation may be used. The low overpotential may also be used to minimize or eliminate the evolution of oxygen from water at the anode 118. The overall process is generally driven by the power source 106. Combinations of anodes 118, cathodes 120, electrolytes 122, catalysts 124, introduction of mixed gas into the cell 102, pH levels and the electric potential from the power source 106 may be used to control the reaction in the cell 102.

In some nonaqueous embodiments, the solvent may include methanol, acetonitrile, and/or other nonaqueous solvents. The electrolytes generally include tetraalkyl ammonium salts and a heterocyclic catalyst. A primary product may be oxalate in a completely nonaqueous system. In a system containing nonaqueous catholyte and aqueous anolyte, the compounds generally include all of the compounds seen in aqueous systems with higher yields.

The electrodes may be a suitable conductive electrode, such as Al, Au, Ag, C, Cd, Co, Cr, Cu, Cu alloys (e.g., brass and bronze), Ga, Hg, In, Mo, Nb, Ni, Ni alloys, Ni—Fe alloys, Sn, Sn alloys, Ti, V, W, Zn, stainless steel (SS), austenitic steel, ferritic steel, duplex steel, martensitic steel, Nichrome, elgiloy (e.g., Co—Ni—Cr), degenerately doped p-Si, degenerately doped p-SI:As and degenerately doped p-Si:B. Other conductive electrodes may be implemented to meet the criteria of a particular application.

The catalyst may be one or more substituted aromatic heterocyclic amines or unsubstituted aromatic heterocyclic amines as homogeneous catalysts in the aqueous solution. A concentration of the catalyst may be about 1 mM to 1 M. Suitable amines are generally heterocycles which may include, but are not limited to, heterocyclic compounds that are 5-member or 6-member rings with at least one ring nitrogen. Aromatic heterocyclic amines may include, but are not limited to, unsubstituted and substituted pyridines and imidazoles. Substituted pyridines and imidazoles may include, but are not limited to mono and disubstituted pyridines and imidazoles. For example, suitable catalysts may include straight chain or branched chain lower alkyl (e.g., C1-C10) mono and disubstituted compounds such as 2-methylpyridine, 4-tertbutyl pyridine, 2,6-dimethylpyridine (2,6-lutidine); bipyridines, such as 4,4'-bipyridine; amino-substituted pyridines, such as 4-dimethylamino pyridine; and hydroxyl-substituted pyridines (e.g., 4-hydroxy-pyridine) and substituted or unsubstituted quinoline or isoquinolines. Catalysts may also suitably include substituted or unsubstituted dinitrogen heterocyclic amines, such as pyrazine, pyridazine and pyrimidine. Other catalysts generally include azoles, imidazoles, indoles, oxazoles, thiazoles, substituted species and complex multi-ring amines such as adenine, pterin, pteridine, benzimidazole, phenonthroline and the like.

The electrolyte may be suitably a salt, such as KCl, $NaNO_3$, $Na_2SO_4$, NaCl, NaF, $NaClO_4$, $KClO_4$, $K_2SiO_3$, or $CaCl_2$ at a concentration of about 0.5 M. A concentration of the electrolytes may range from about 0.1 M to 1M. Other electrolytes may include, but are not limited to, all group 1 cations (e.g., H, Li, Na, K, Rb and Cs) except Francium (Fr), Ca, ammonium cations, alkylammonium cations and alkyl amines. Additional electrolytes may include, but are not limited to, all group 17 anions (e.g., F, Cl, Br, I and At), borates, carbonates, nitrates, nitrites, perchlorates, phosphates, polyphosphates, silicates and sulfates. Na generally performs as well as K with regard to best practices, so NaCl may be exchanged with KCl. NaF may perform about as well as NaCl, so NaF may be exchanged for NaCl or KCl in many cases. Larger anions tend to change the chemistry and favor different products. For instance, sulfate may favor polymer or methanol production while Cl may favor products such as acetone. The pH of the solution is generally maintained at about pH 3 to 8, suitably about 4.7 to 5.6.

The process is generally controlled to get a desired product (e.g., oxalate) by using combinations of specific conductive cathodes, catalysts, electrolytes, surface morphology of the electrodes and/or introduction of reactants relative to the cathode. Faradaic yields for the products generally range from less than 1% to more than 90% (e.g., up to 100%).

Figure 2:
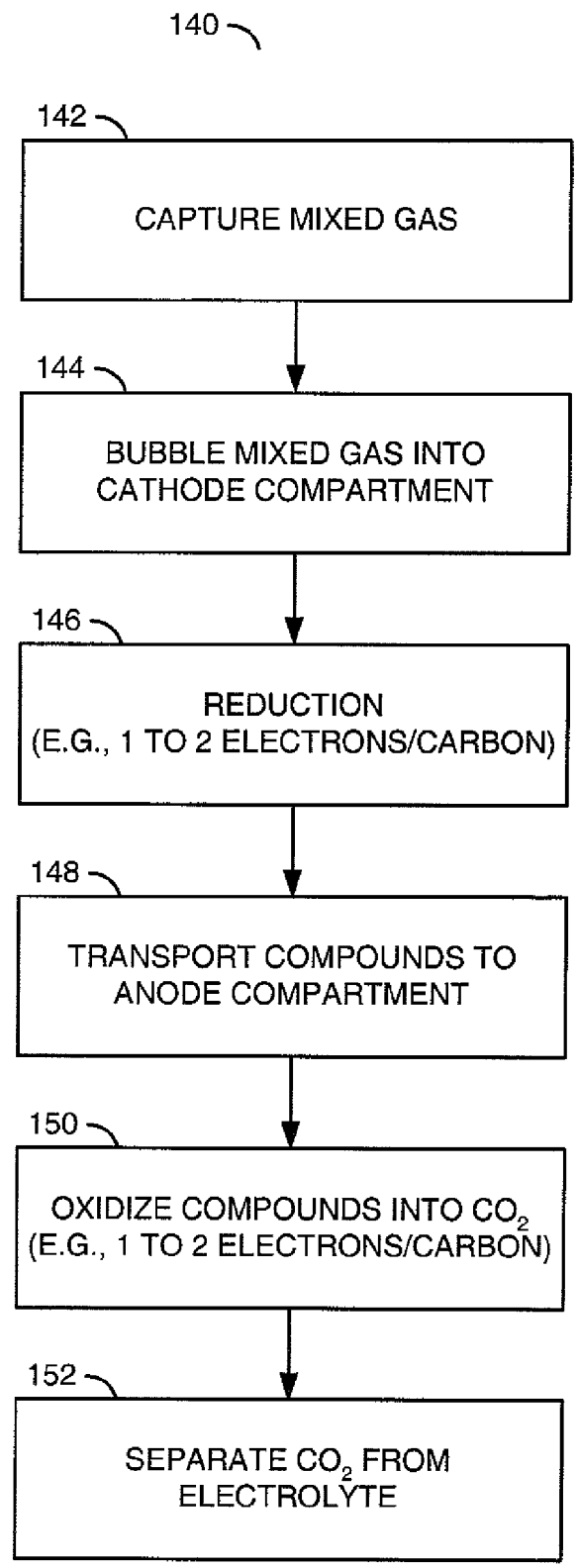
FIG. 2 is a flow diagram of an example method for separating carbon dioxide from a mixture of gases.

Referring to FIG. 2, a flow diagram of an example method 140 for separating carbon dioxide from a mixture of gases is shown. The method 140 generally comprises a step (or block) 142, a step (or block) 144, a step (or block) 146, a step (or block) 148, a step (or block) 150 and a step (or block) 152. The method (or process) 140 may be implemented by the system 100.

In the step 142, a mixture of gases that includes carbon dioxide may be captured. The mixed gas may be bubbled into the chamber 114b in the step 144. The carbon dioxide may react with the cathode 120 in the step 146 and be converted into one or more compounds (e.g., oxalate, oxalic acids and/or oxalate salts). Where the compound is oxalate, a reaction at the cathode 120 may be represented as follows:

$$2CO_2 + 2e- \rightarrow C_2O_4^{2-}$$

The compounds may be transported from the compartment 114b to the compartment 114a in the step 148. In an undivided type of cell 102, movement of the compounds generally takes place through ion transportation. The negatively charged compounds (e.g., oxalate$^{2-}$) may be transported from the cathode 120 to the anode 118 by the positive charge at the anode 118. In a divided type of cell 102, an anion selective membrane 116 may also be employed to selectively transport the compounds from the compartment 114b to the compartment 114a. Transportation may also be aided by mechanical agitation (e.g., stirring) of the electrolyte 122 and/or other common methods. Once in the compartment 114a, at least one of the compounds may be oxidized back into carbon dioxide by the anode 118 in the step 150. An oxidation of oxalate at the anode 118 may be represented as follows:

$$C_2O_4^{2-} \rightarrow 2CO_2 + 2e$$

In the step 152, the purified (recovered) carbon dioxide may be extracted (separated) from the electrolyte 122.

The calculated energy consumed in a scaled system 100 is generally less than 500 kilowatt hours (kWh) per ton of carbon dioxide. In some embodiments, the energy consumed may be as low as 200 kWh per ton of carbon dioxide. The calculated energy generally compares favorably to a 600 kWh per ton rate using existing solutions.

Some process embodiments of the present invention for making/converting hydrocarbons generally consume a small amount of water (e.g., approximately 1 to 3 moles of water) per mole of carbon fixed. Therefore, the processes may be a few thousand times more water efficient than existing biofuel production techniques. With the purification process described above, little to no water is generally consumed after the initial solution has been established in the cell 102. The oxalic acids and/or oxalate salts may be created at the cathode 120 from the carbon dioxide in the mixed gas and converted back into carbon dioxide at the anode 118 by direct oxidation. No water may be consumed from the chemistry, though small losses may occur in plant operations.

Cell design and cathode treatment (e.g., surface morphology or surface texture) may both affect product yields and current density at the cathode 120. For instance, a divided cell 102 with a stainless steel 2205 cathode 120 in a KCl electrolyte 122 generally has higher yields with a heavily scratched (rough) cathode 120 than an unscratched (smooth) cathode 120. Matte tin generally performs different than bright tin. Maintaining the mixed gas bubbling only on the cathode side of the divided cell 102 (e.g., in compartment 114b) may also alter yields.

The cell potential may alter product yields in some cases. By way of example, using a combination of a stainless steel 2205 cathode 120 with an imidazole catalyst 124 and a 0.5 M KCl electrolyte 122, yields generally shift from primarily formic acid to primarily acetone and ethanol by lowering the cathode potential from −1.06 volts to −0.96 volts.

Faradaic yields of the compounds may be improved by controlling the electrical potential of the reaction. By maintaining a constant potential at the cathode 120, hydrogen evolution is generally reduced and faradaic yields of the compounds increased. Addition of hydrogen inhibitors, such as acetonitrile, certain heterocycles, alcohols, and other chemicals may also increase yields of compounds.

With some embodiments, stability may be improved with cathode materials known to poison rapidly when reducing carbon dioxide. Copper and copper-alloy electrodes commonly poison in less than an hour of electrochemically reducing carbon dioxide. However, when used with a heterocyclic amine catalyst, copper-based alloys operated for many hours without any observed degradation in effectiveness. The effects may be particularly enhanced by using sulfur containing heterocycles.

Heterocycles other than pyridine may catalytically reduce carbon dioxide in the electrochemical process using many aforementioned cathode materials, including tin, steels, nickel alloys and copper alloys. Nitrogen-containing heterocyclic amines shown to be effective include 4,4'-bipyridines, picolines (methyl pyridines), 1utidines (dimethyl pyridines), hydroxy pyridines, imidazole, benzimidazole, methyl imidazole, pyrazine, pyrimidine, pyridazine, pyridazineimidazole, nicotinic acid, quinoline, adenine, azoles, indoles and 1,10 phenanthroline. Sulfur containing heterocycles include thiazole, aminothiazoles, thiophene. Oxygen containing heterocycles include furan and oxazole. As with pyridine, the combination of catalyst, cathode material and electrolyte may be used to control the reactions.

Figure 3:
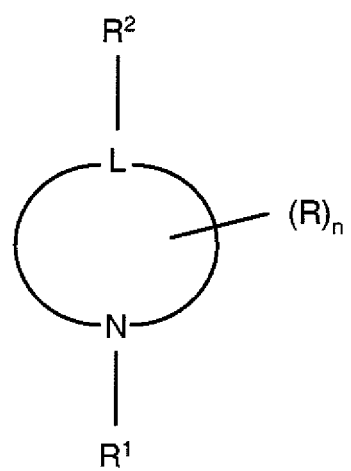
FIG. 3 is a formula of an aromatic heterocyclic amine catalyst.

Referring to FIG. 3, a formula of an aromatic heterocyclic amine catalyst is shown. The ring structure may be an aromatic 5-member heterocyclic ring or 6-member heterocyclic ring with at least one ring nitrogen and is optionally substituted at one or more ring positions other than nitrogen with R. L may be C or N. R1 may be H. R2 may be H if L is N or R2 is R if L is C. R is an optional substitutent on any ring carbon and may be independently selected from H, a straight chain or branched chain lower alkyl, hydroxyl, amino, pyridyl, or two R's taken together with the ring carbons bonded thereto are a fused six-member aryl ring and n=0 to 4.

Figure 4:
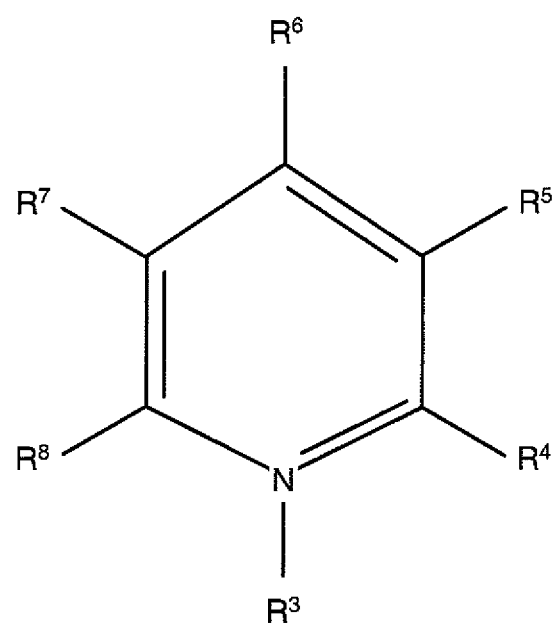
FIGS. 4-6 are formulae of substituted or unsubstituted aromatic 5-member heterocyclic amines or 6-member heterocyclic amines.
Figure 5:
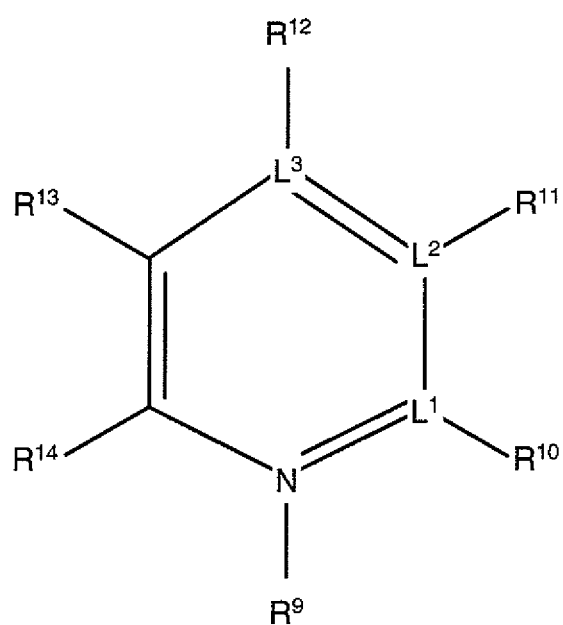
Figure 6:
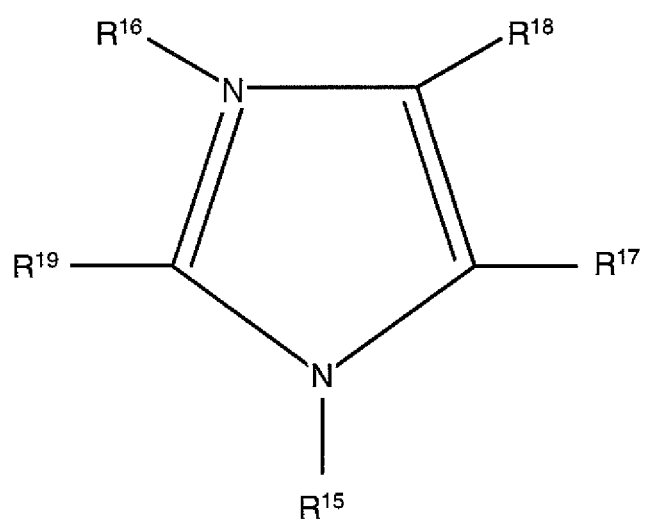

Referring to FIGS. 4-6, formulae of substituted or unsubstituted aromatic 5-member heterocyclic amines or 6-member heterocyclic amines are shown. Referring to FIG. 4, R3 may be H. R4, R5, R7 and R8 are generally independently H, straight chain or branched chain lower alkyl, hydroxyl, amino, or taken together are a fused six-member aryl ring. R6 may be H, straight chain or branched chain lower alkyl, hydroxyl, amino or pyridyl.

Referring to FIG. 5, one of L1, L2 and L3 may be N, while the other L's may be C. R9 may be H. If L1 is N, R10 may be H. If L2 is N, R11 may be H. If L3 is N, R12 may be H. If L1, L2 or L3 is C, then R10, R11, R12, R13 and R14 may be independently selected from straight chain or branched chain lower alkyl, hydroxyl, amino, or pyridyl.

Referring to FIGS. 6, R15 and R16 may be H. R17, R18 and R19 are generally independently selected from straight chain or branched chain lower alkyl, hydroxyl, amino, or pyridyl.

Some embodiments of the present invention may be further explained by the following examples, which should not be construed by way of limiting the scope of the invention.

EXAMPLE 1

General Electrochemical Methods

Chemicals and materials. All chemicals used were >98% purity and used as received from the vendor (e.g., Aldrich), without further purification. Either deionized or high purity water (Nanopure, Barnstead) was used to prepare the aqueous electrolyte solutions.

Electrochemical system. The electrochemical system was composed of a standard two-compartment electrolysis cell 102 to separate the anode 118 and cathode 120 reactions. A 0.5M $CaCl_2$/KCl was generally used as the supporting electrolyte 122. The cathode 120 was ferritic steel and the anode 118 was a mixed metal oxide. A concentration of 30 mM imidazole was used as the catalyst 124. Carbon dioxide was bubbled into the cathode compartment 114b. An evolution of oxalate was generally observed in the cell 102.

The working electrode was of a known area. Before and during all electrolysis, the reactants were continuously introduced into the electrolyte to saturate the solution. The resulting pH of the solution was maintained at about pH 3 to pH 8, suitably, pH 4.7 to pH 5.6, depending on the aromatic heterocyclic amine employed. For example, the pH levels of 10 mM solutions of 4-hydroxy pyridine, pyridine and 4-tertbutyl pyridine were 4.7, 5.28 and 5.55, respectively.

Referring to FIG. 7, a table illustrating relative product yields for different cathode material, catalyst, electrolyte, pH level and cathode potential combinations is shown. The combinations listed in the table generally are not the only combinations providing a given product. The combinations illustrated may demonstrate high yields of the products at the lowest potential (e.g., <1 volt amplitude).

EXAMPLE 2

Analysis of Products of Electrolysis

Electrochemical experiments were generally performed using a CH Instruments potentiostat or a DC power supply with current logger to run bulk electrolysis experiments. The CH Instruments potentiostat was generally used for cyclic voltammetry. Electrolysis was run under potentiostatic conditions from approximately 6 hours to 30 hours until a relatively similar amount of charge was passed for each run.

Gas Chromatography. The electrolysis samples were analyzed using a gas chromatograph (HP 5890 GC) equipped with a FID detector. Removal of the supporting electrolyte salt was first achieved with an Amberlite IRN-150 ion exchange resin (cleaned prior to use to ensure no organic artifacts by stirring in a 0.1% v/v aqueous solution of Triton X-100, reduced (Aldrich), filtered and rinsed with a copious amount of water, and vacuum dried below the maximum temperature of the resin (approximately 60° C.) before the sample was directly injected into the GC which housed a DB-Wax column (Agilent Technologies, 60 m, 1 micrometer (μm) film thickness). Approximately 1 gram of resin was used to remove the salt from 1 milliliter (mL) of the sample. The injector temperature was held at 200° C., the oven temperature maintained at 120° C., and the detector temperature at 200° C.

Mass spectrometry. Mass spectral data was also collected to identify all organic compounds. In a typical experiment, the sample was directly leaked into an ultrahigh vacuum chamber and analyzed by an attached SRS Residual Gas Analyzer (with the ionizer operating at 70 electron-volts and an emission current of 1 mA). Samples were analyzed against standard methanol spectra obtained at the same settings to ensure comparable fragmentation patterns. Mass spectral data confirmed the presence of methanol and proved that the initial solution before electrolysis contained no reduced $CO_2$ species. Control experiments also showed that after over 24 hours under illumination the epoxy used to insulate the backside of the electrode did not leach any organic material that would give false results for the reduction of $CO_2$. NMR spectra of electrolyte volumes after illumination were obtained using an automated Bruker Ultrashield™ 500 Plus spectrometer with an excitation sculpting pulse technique for water suppression. Data processing was achieved using MestReNova software. For methanol standards and electrolyte samples, the representative signal for methanol was observed between 3.18 to 3.30 parts per million (ppm).

Nuclear Magnetic Resonance. NMR spectra of electrolyte volumes after bulk electrolysis were also obtained using an automated Bruker Ultrashield™ 500 Plus spectrometer with an excitation sculpting pulse technique for water suppression. Data processing was achieved using MestReNova software.

By way of example, a fixed cathode (e.g., stainless steel 2205) may be used in an electrochemical system where the electrolyte and/or catalyst are altered to change the reaction compounds. In a modular electrochemical system, the cathodes may be swapped out with different materials to change the compounds.

Some embodiments of the present invention generally provide for new cathode materials, new electrolyte materials and new sulfur and oxygen-containing heterocyclic catalysts. Specific combinations of cathode materials, electrolytes and catalysts may be used to get a desired organic compounds that may be used to efficiently purify (separate) carbon dioxide from other gases. Specific process conditions may be established that maximize the carbon dioxide conversion to oxalate. The oxalate may be evolved back into carbon dioxide at the anode and/or stored then evolved at a later time. A result may be a purer form of carbon dioxide gas than the original mixed gas.

Cell parameters may be selected to minimize unproductive side reactions like $H_2$ evolution from water electrolysis. Choice of specific configurations of heterocyclic amine pyridine catalysts with engineered functional groups may be utilized in the system 100 to achieve high faradaic rates. Process conditions described above may facilitate long life (e.g., improved stability), electrode and cell cycling and product recovery. Heterocyclic amines related to pyridine may be used to improve reaction rates, product yields, cell voltages and/or other aspects of the reaction. Heterocyclic catalysts that contain sulfur or oxygen may also be utilized in the carbon dioxide reduction.

Some embodiments of the present invention may provide cathode and electrolyte combinations for reducing carbon dioxide to organic compounds in commercial quantities. Catalytic reduction of carbon dioxide may be achieved using various cathodes. High faradaic yields (e.g., >20%) of organic compounds with steel and nickel alloy cathodes at ambient temperature and pressure may also be achieved. Copper-based alloys used at the electrodes may remain stabile for long-term reduction of carbon dioxide.

Some embodiments of the present invention may provided for capturing carbon dioxide from a mixture of gases. The capture may produce a purer form of carbon dioxide, oxalate, oxalic acids and/or oxalate salts. The purification generally consumes lower amounts of energy, have reaction rates high enough for scalability, and remains stable for long periods.

Various process conditions disclosed above, including electrolyte choice, cell voltage, and manner in which the mixed gas is bubbled, generally improve control of the reaction. Greater control over the reactions generally open the possibility for commercial systems that are modular and adaptable to different situations.

While the invention has been particularly shown and described with reference to the preferred embodiments thereof, it will be understood by those skilled in the art that various changes in form and details may be made without departing from the scope of the invention.

The invention claimed is:

1. A method for purification of carbon dioxide from a mixture of gases, comprising the steps of:
    (A) bubbling said gases into a solution of an electrolyte in a divided electrochemical cell, wherein (i) said divided electrochemical cell comprises an anode in a first cell compartment and a cathode in a second cell compartment, (ii) said cathode reducing said carbon dioxide into one or more of oxalate, organic acids and oxalate salts and (iii) said anode oxidizing at least one of said one or more of oxalate, organic acids and oxalate salts into said carbon dioxide;
    (B) separating said carbon dioxide from said solution; and
    (C) adding to said solution one or more of (i) a hydrogen inhibitor, (ii) a heterocyclic compound and (iii) an alcohol.

2. The method according to claim 1, wherein said oxidizing uses at most two electrons per carbon atom.

3. The method according to claim 1, wherein said purification consumes approximately no additional water after said solution has been established in said divided electrochemical cell.

4. The method according to claim 1, wherein an energy consumed by said purifying of said carbon dioxide is less than 500,000 watt hours per ton of carbon dioxide.

* * * * *